United States Patent Office 2,897,230
Patented July 28, 1959

2,897,230

ADDUCTS OF ALKYLATED AROMATIC HYDRO-CARBONS AND FUMARATE ESTERS

Joachim Dazzi, Dayton, Ohio, assignor to Monsanto Chemical Company, St. Louis, Mo., a corporation of Delaware No Drawing. Application November 23, 1954
Serial No. 470,798

15 Claims. (Cl. 260—475)

This invention relates to derivatives of α,β-unsaturated olefinic acids and more particularly provides a new and valuable class of polycarboxylates, a process of producing the same, and vinyl chloride polymers plasticized with the new compounds.

An object of the invention is the provision of new and useful polycarboxylates. Another object of the invention is the preparation of useful addition products of certain aliphatic α,β-unsaturated olefinic dicarboxylic acid esters and hydrocarbons containing an aromatic nucleus. A further object of the invention is to provide for the synthetic resins and plastics, rubber, and textile industries a new class of stable, viscous compounds of high carboxylate content.

These and other objects hereinafter disclosed are provided by the following invention wherein there are prepared liquid mixtures of polycarboxylates by the addition of certain alkylated aromatic hydrocarbons with certain esters of aliphatic α,β-olefinic dicarboxylic acids. The reaction is one of simple addition in which one mole of the alkylated aromatic compound adds to from 2 to 20 moles of the ester, substantially according to the scheme:

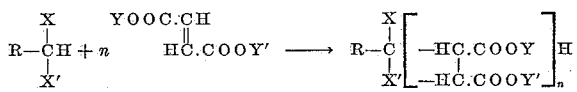

in which R is a hydrocarbon radical free of non-benzenoid unsaturation having from 6 to 18 carbon atoms and containing an aromatic nucleus attached through one carbon atoms thereof to the remainder of the molecule of which said R forms a part, X is selected from the class consisting of hydrogen and the methyl and ethyl radicals. X' is a branched-chain alkyl radical when X is hydrogen and is selected from the class consisting of straight-chain and branch-chain alkyl radicals when X is one of said methyl and ethyl radicals and the total number of carbon atoms in the sum of X and X' is from 2 to 17, and $n$ is an integer of from 2 to 20.

One class of alkylated aromatic hydrocarbons having the above formula and useful for the present purpose comprises alkylated benzenes having one hydrogen atom attached to the α-carbon atom of a branched-chain alkyl group thereof and containing a total of from 9 to 27 carbon atoms in the molecule. Examples of such presently useful alkyl benzenes are isopropylbenzene, 2-, 3-, and 4-diisopropylbenzene, 1,3,5-triisopropylbenzene, 4 - ethylcumene, sec-butylbenzene, isoamylbenzene, (2-ethylhexyl)-benzene, 2-isopropyl-n-octylbenzene, isododecylbenzene, branched-chain octadecylbenzene, 3-sec-butyl-n-hexadecylbenzene, etc.

Another class of alkylated aromatic hydrocarbons which are used in preparing the present polycarboxylates are alkylated naphthalenes having one hydrogen atom attached to the α-carbon atom of a branch-chain alkyl group thereof, e.g., 1- or 2-isopropylnaphthalene, 1,2-diisopropylnaphthalene, 1-sec-butyl-naphthalene, 1-isooctylnaphthalene, 2-iso-dodecylnaphthalene, etc.

Still another class of presently useful alkylated aromatic hydrocarbons includes alkylated biphenyls in which the α-carbon atom of a branched-chain alkyl group thereof carries one hydrogen atom, e.g., 2-, 3-, or 4-isopropylbiphenyl, 4,4'-diisopropyl- or di-sec-butylbiphenyl, 4-tert-dodecyl-4'-isopropylbiphenyl, 2-isooctyl-4-n-propylbiphenyl, 4-isopropyl-4'-methylbiphenyl, etc.

Alkyl or alkoxyalkyl esters of fumaric acid which may be employed in preparing the present adducts are the simple or mixed alkyl fumarates such as methyl, ethyl, n-propyl, isopropyl, butyl, isoamyl, n-hexyl, n-heptyl, n-octyl or 2-ethylhexyl fumarate, ethyl methyl fumarate, ethyl n-hexyl fumarate, isopropyl-n-octyl fumarate, etc. The simple alkoxyalkyl fumarates or mixed fumarates in which the alcohol portions of the ester are derived from two different alkoxyalkanols or from one mole of an alkoxyalkanol and one mole of an alkanol are likewise useful. Examples of such alkoxyalkyl fumarates are bis-(2-ethoxyethyl) fumarate, bis-(3-butoxypropyl) fumarate, bis-(4-methoxybutyl) fumarate, ethyl 2-ethoxyethyl fumarate, butyl 3-propoxypropyl fumarate, etc.

Reaction of the alkylated aromatic hydrocarbons with the fumaric acid esters to form addition products of high carboxylic content takes place readily by heating the hydrocarbon with the ester in the presence or absence of an inert diluent or solvent, ordinarily at super-atmospheric pressure. When operating at an atmospheric pressure, temperatures of from, say, 200–300° C. and preferably of from 240–290° C. are used. The number of carboalkoxy groups present in the liquid adduct depends upon the nature of the fumarate, the alkylated aromatic hydrocarbon and upon the reaction conditions employed. Generally, operation within the high temperature ranges, i.e., temperatures of above, say 200° C., and below the decomposition point of any of the reactants, leads to production of adducts containing a greater number of carboalkoxy groups than are present in adducts obtained from the same hydrocarbon and the same ester at the lower temperatures. The number of carboalkoxy groups present in the adduct also depends upon the individual fumarate employed. Usually the lower alkyl fumarates are more reactive then either the higher alkyl fumarates or the higher alkoxyalkl fumarates. In view of the effect of the reaction conditions and nature of the fumarate upon the extent to which the fumarate participates in the reaction, it is recommended that for each initial run there be experimentally determined the operating conditions to be observed for obtaining an alkylated aromatic hydrocarbon-fumarate adduct containing the desired number of carboalkoxy radicals.

The quantity of fumarate present in the adduct will also depend upon its availability in the reaction mixture. Obviously for the formation of adducts in which one mole of the hydrocarbon has added to an average of, say, 15 moles of the fumarate, it is necessary to provide in the initial reaction mixture a quantity of fumarate which is substantially in excess of that required for the preparation of an adduct in which one mole of the hydrocarbon is added to an average of, say, only 5 moles of the ester. Hence, in preparing the present adducts, the quantity of fumarate for obtaining a desired adduct should be present in the initial reaction mixture in the calculated quantities.

Since the alkyl or alkoxyalkyl fumarates are generally miscible with most of the presently useful hydrocarbons under the reaction conditions used, no extraneous solvent or diluent need generally be employed. For successful reaction, a diluent may or may not be present. When working with the lower boiling fumarates and/or with the lower boiling alkylated aromatic hydrocarbons, it is advantageous to operate at super-atmospheric pressures.

In practice, the hydrocarbon and the ester are mixed in a reaction vessel in proportions required for an adduct of a desired carboalkoxy content and the mixture is heated, say, at the refluxing temperature thereof, for a time of, say, a few hours to several days, or until the reaction mixture no longer evidences a change in refractive-index upon continued heating. The product is generally a viscous liquid which comprises a mixture of adducts of varying carboalkoxy content and unreacted initial reactants. Any unreacted material may be readily recovered, e.g., by distillation.

The present adducts are stable, high-boiling, viscous liquids. They may be advantageously employ for a variety of technical uses, e.g., as intermediates for the preparation of polycarboxylic compounds to be employed for polyamide manufacture, as moisture-proofing agents, lubricant adjuvants, etc.

The present fumarate adducts are particularly valuable as plasticizers for polyvinyl chloride and copolymers of at least 70 percent by weight of vinyl chloride and up to 30 percent by weight of an unsaturated monomer copolymerized therewith, for example, vinyl acetate, vinylidene chloride, etc. The present adducts impart great flexibility to vinyl chloride polymers at very low temperatures; they are compatible with such polymers and show no exudation of plasticizer even at plasticizer content of up to 50 percent. Although the quantity of plasticizer will depend upon the particular polymer to be plasticized and upon its molecular weight, it is generally found that compositions having from 5 percent to 50 percent by weight of the present adducts will, in most cases, be satisfactory for general utility. The good flexibility of the plasticized composition increases with increasing plasticizer concentration.

In evaluating plasticizer efficiency use is made of the following empirical testing procedures:

*Compatibility.*—Visual inspection of the plasticized composition is employed, incompatibility of the plasticizer with the polymer being demonstrated by cloudiness and exudation of the plasticizer.

*Hardness.*—A standard instrument made by the Shore Instrument Company is used for this determination and expresses the hardness in units of from 1 to 100. The hardness of a composition is judged by its resistance to the penetration of a standard needle applied to the composition under a standard load for a standard length of time.

*Low temperature flexibility.*—Low temperature flexibility is one of the most important properties of elastomeric vinyl compositions. While many plasticizers will produce flexible compositions at room temperature, the flexibility of these compositions at low temperatures may vary considerably, i.e., plasticized polyvinyl chloride compositions that are flexible at room temperatures often become very brittle and useless at low temperatures. Low temperature flexibility tests herein employed are according to the Clash-Berg method. This method determines the torsional flexibility of a plastic at various temperatures. The temperature at which the vinyl composition exhibits an arbitrarily established minimum flexibility is defined as the low temperature flexibility of the composition. This value may also be defined as the lower temperature limit of the plasticized composition's usefulness as an elastomer.

*Volatility.*—Just as a decrease in low temperature often results in decreased flexibility of a plasticized polymer composition so does a decrease in plasticizer concentration when caused by volatilization of the plasticizer. Hence, plasticizers which are readily volatilized from the plasticized composition as a result of aging or heating are inefficient because upon volatization the plasticized compositions become stiff and hard. The test for plasticizer volatility herein employed is a modified carbon absorption test procedure of the Society of Plastics Industry.

*Water resistance.*—The amount of water absorption and the amount of leaching that takes place when the plasticized composition is immersed in distilled water for 24 hours is determined.

The invention is further illustrated, but not limited, by the following examples:

Example 1

A mixture consisting of 123 g. (0.5 mole) of isododecylbenzene ($n_D^{25}$ 1.4882) and 228 g. (1 mole) of butyl fumarate ($n_D^{25}$ 1.4440) was refluxed (270–280° C.) for 5 hours and 10 minutes. The initial refractive index of the mixture was $n_D^{25}$ 1.4610 and at the end of the refluxing period it was 1.4711. Heating of the resulting product in a nitrogen atmosphere to remove material (83.8 g.) boiling below 229° C./2 mm. gave as residue 147 g. of a viscous adduct ($n_D^{25}$ 1.4687) and having a saponification equivalent, in two different determinations, of 141.9. This value corresponds to the calculated saponification equivalent of an adduct of one mole of the dodecylbenzene with an average of about 4.4 moles of butyl fumarate.

Example 2

A mixture consisting of 119 g. (0.5 mole) of a diisopropylbiphenyl and 228 g. (1 mole) of butyl fumarate was refluxed (270–275° C.) for 9 hours. During the refluxing period the refractive index of the reaction mixture rose for 1.4869 to 1.4975. Heating of the resulting product in a nitrogen atmosphere at a pressure of from 1 to 2 mm. of mercury to a temperature of 225° C. to remove low-boiling materials gave as residue 123 g. of the viscous adduct ($n_D^{25}$ 1.4866) and analyzing 67.42% carbon and 8.38% hydrogen, corresponding to an adduct of one mole of the diisopropylbiphenyl and an average of about 5.5 moles of the butyl fumarate. The calculated C and H values for a molecular weight of 1435 (corresponding to the 1:5.5 adduct) are C, 67.50% and H, 8.85%.

Example 3

This example describes the preparation of an adduct from a commercially available p-isododecyltoluene ($n_D^{25}$ 1.4891), 95% of which boils at 293–305° C.

A mixture consisting of 91 g. (0.35 mole) of the p-isododecyltoluene and 208 g. (0.8 mole) of bis(2-ethoxyethyl) fumarate was heated at about 270° C. for 6 hours. During the heating period the refractive index of the reaction mixture rose from $n_D^{25}$ 1.4632 to $n_D^{25}$ 1.4694. Distillation of the resulting reaction product in a nitrogen atmosphere at a pressure of 0.8 mm. of mercury to remove material boiling below 254° C. gave as residue 128.0 g. of the viscous adduct, $n_D^{25}$ 1.4718, analyzing 57.53% carbon and 8.08% hydrogen, corresponding to an adduct in which one mole of the isododecyltoluene is combined with an average of 13 moles of the bis(2-ethoxyethyl) fumarate. The calculated values for the 1:13 adduct are 57.48% C. and 8.03% H.

Example 4

This example describes the preparation of an adduct from the dodecyltoluene of Example 3 and butyl fumarate.

A mixture consisting of 130 g. (0.5 mole) of the dodecyltoluene and 228 g. (1.0 mole) of the butyl fumarate was brought to a temperature of 268° C. within a period of about 30 minutes and then kept at a temperature of from 261–270° C. for 6 hours. Fractionation of the resulting reaction mixture gave the two adducts:

I. B.P. 211–236° C./1–2 mm., 39 g., $n_D^{25}$ 1.4686, analyzing 66.78% C, 9.43% H and (by difference) 23.79% O.

II. Residue: B.P. above 236° C./1–2 mm., 85 g., $n_D^{25}$ 1.4715, analyzing 65.95% C, 9.15% H and (by difference) 24.90% O.

Example 5

60 parts of polyvinyl chloride and 40 parts by weight of the adduct of Example 1 were mixed on a rolling mill to a homogeneous blend. During the milling there was observed substantially no fuming and discoloration. A molded sheet of the mixture was clear and transparent and substantially colorless. Testing of the molded sheet for low temperature flexibility, according to the testing procedure described above, gave a value of minus 14.5° C. Tests on the volatility characteristics of the plasticized composition gave a value of 1.74 percent, which showed very good retention of plasticizer and indicated good temperature characteristics of the composition. The plasticized material had a hardness of 77 before the volatility test and a hardness of 78 after the volatility test. When subjected to heat at a temperature of 325° F., for a period of 30 minutes the clarity and color of the molded product was substantially unchanged. Tests of the water-resistance properties of the plasticized material employing the testing procedure described above showed a solids-loss of only 0.014 percent and an 0.597 percent water-absorption value.

Example 6

The diisopropylbiphenyl-butyl fumarate adduct of Example 2 was evaluated as a polyvinyl chloride plasticizer employing the procedure described in Example 5. Testing of the molded sheet thus obtained for low temperature flexibility gave a value of minus 5.7° C. Testing of the volatility characteristics of the plasticized composition gave a value of 1.16%. The plasticized material had a hardness of 83 before the volatility test and a hardness of 84 after the volatility test. When subjected to heat at a temperature of 325° F., for a period of 30 minutes, the clarity and color of the molded product was substantially unchanged. Tests of the water-resistance properties of the plasticized material employing the testing procedure described above showed a solids-loss of only 0.400 percent and an 0.577 percent water-absorption value.

Example 7

The plasticizing efficiency for polyvinyl chloride of the fraction I and the residue II of Example 4 was evaluated using the procedure described in Example 5. With fraction I there was obtained a low temperature flexibility value of minus 21.6° C., a volatility value of 3.77%, a solids-loss of 0.17% and a water-absorption value of 0.83%. With the residue II there was obtained a low temperature flexibility value of minus 4.3° C., a volatility value of 0.89%, a solids-loss of 0.09% and a water-absorption value of 0.75%. When subjected to heat at a temperature of 325° F. for 30 minutes, the clarity and color of the molded products obtained from either of the adducts of Example 4 were substantially unchanged.

The resistance of molded test speciments of polyvinyl chloride plasticized with 40% by weight of the residue II of Example 4 was determined as follows:

A 2″ diameter 40 mil. disc was suspended in a 50° C. oven for a 3-hour conditioning period to eliminate water, then cooled and weighed. The conditioned sample was then immersed in 400 ml. of kerosene for a period of 24 hours, at 27° C. The sample was then removed from the kerosene, blotted dry and suspended in a force-draft 80° C. oven for 4 hours. The sample was then cooled and weighed. The percent loss in weight thus determined, i.e., the kerosene extraction value, was found to be 1.22%. This shows very good kerosene resistance, that of dioctyl phthalate, a commercial plasticizer, being 82% when evaluated by the same test method.

Example 8

Adducts of other alkyl fumarates or of other alkoxyalkyl fumarates and alkylated aromatic hydrocarbons having from 1 to 2 hydrogen atoms attached to the α-carbon of the alkyl group thereof, likewise possess very good plasticizer properties for vinyl chloride polymers. Thus by employing 40 parts by weight of the adduct of diethyl or methyl n-octyl fumarate and isopropylbenzene or cumene, with 60 parts by weight of polyvinyl chloride or with 60 parts by weight of a vinyl chloride-vinyl acetate copolymer known to the trade as "Vinylite," there may be obtained clear, colorless compositions of very good flexibility and stability.

While the above examples show only compositions in which the ratio of plasticizer to polymer content is 40:60, this ratio being employed in order to get comparable efficiencies, the content of ester to polyvinyl chloride may be widely varied, depending upon the properties desired in the final product. For many purposes a plasticizer content of, say, from only 10 percent to 20 percent is preferred. The present adducts are compatible with polyvinyl chloride over wide ranges of concentrations, up to 50 percent of esters based on the total weight of the plasticized composition yielding desirable products.

Although the invention has been described particularly with reference to the use of the present adducts as plasticizers for polyvinyl chloride, these adducts are advantageously employed also as plasticizers for copolymers of vinyl chloride, for example, the copolymers of vinyl chloride with vinyl acetate, vinylidene chloride, etc. Preferably, such copolymers have a high vinyl chloride content, i.e., a vinyl chloride content of at least 70 percent by weight of vinyl chloride and up to 30 percent by weight of the copolymerizable monomer.

The plasticized polyvinyl halide compositions of the present invention have good thermal stability; however, for many purposes it may be advantageous to use known stabilizers in the plasticized compositions. Inasmuch as the present adducts are substantially unreactive with the commercially available heat and light stabilizers which are commonly employed with polyvinyl chloride or copolymers thereof, the presence of such materials in the plasticized products does not impair the valuable properties of the adducts. The present adducts are of general utility in softening vinyl chloride polymers. They may be used as the only plasticizer components in a compound vinyl chloride polymer or they may be used in conjunction with other plasticizers.

What I claim is:

1. An adduct of one mole of an alkylated aromatic hydrocarbon having a total of from 9 to 27 carbon atoms and selected from the class consisting of alkylated benzenes, alkylated naphthalenes and alkylated biphenyls having one hydrogen atom attached to the α-carbon atom of a branched-chain alkyl group thereof, and from 2 to 20 moles of a fumarate of the formula

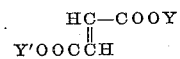

in which Y and Y' are selected from the class consisting of alkyl and alkoxyalkyl radicals of from 1 to 8 carbon atoms, said adduct having been formed by heating the alkylated aromatic hydrocarbon with the fumarate at a temperature of from 200° C. to 300° C.

2. An adduct of an alkyl fumarate having from 1 to 8 carbon atoms in the alkyl radical and an alkylated benzene having one hydrogen atom attached to the α-carbon atom of a branched-chain alkyl group thereof and containing a total of from 9 to 27 carbon atoms in said alkylated benzene molecule, from 2 to 20 moles of said fumarate being combined with 1 mole of said alkylated benzene, said adduct having been formed by heating the alkylated benzene with the alkyl fumarate at a temperature of from 200° C. to 300° C.

3. An adduct in which 1 mole of isododecylbenzene is combined with from 2 to 20 moles of an alkyl fumarate having from 1 to 8 carbon atoms in the alkyl radical, said adduct having been formed by heating the isododecylbenzene with the alkyl fumarate at a temperature of from 200° C. to 300° C.

4. An adduct in which 1 mole of a diisopropylbiphenyl is combined with from 2 to 20 moles of an alkyl fumarate having from 1 to 8 carbon atoms in the alkyl radical, said adduct having been formed by heating the diisopropylbiphenyl with the alkyl fumarate at a temperature of from 200° C. to 300° C.

5. An adduct in which 1 mole of isododecyltoluene is combined with from 2 to 20 moles of an alkoxyalkyl fumarate having from 2 to 8 carbon atoms in the alkoxyalkyl group, said adduct having been formed by heating the isododecyltoluene with the alkoxyalkyl fumarate at a temperature of from 200° C. to 300° C.

6. An adduct in which 1 mole of isododecylbenzene is combined with an average of about 10 moles of butyl fumarate, said adduct having been formed by heating the isododecylbenzene with the butyl fumarate at a temperature of 200° C. to 300° C.

7. An adduct in which 1 mole of a diisopropylbiphenyl is combined with an average of about 6 moles of butyl fumarate, said adduct having been formed by heating the diisopropylbiphenyl with the butyl fumarate at a temperature of 200° C. to 300° C.

8. An adduct in which 1 mole of isododecyltoluene is combined with an average of about 18 moles of bis(2-ethoxyethyl) fumarate, said adduct having been formed by heating the isododecyltoluene with said fumarate at a temperature of from 200° C. to 300° C.

9. The method which comprises heating, at a temperature of from 200° C. to 300° C., a mixture of an alkylated aromatic hydrocarbon having a total of from 9 to 27 carbon atoms and selected from the class consisting of alkylated benzenes, alkylated naphthalenes and alkylated biphenyls having one hydrogen atom attached to the α-carbon atom of a branched-chain alkyl group thereof, and a fumarate of the formula

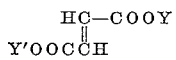

in which Y and Y' are selected from the class consisting of alkyl and alkoxyalkyl radicals of from 1 to 8 carbon atoms, and recovering from the resulting reaction product an adduct in which one mole of the alkylated aromatic hydrocarbon is combined with from 2 to 20 moles of the fumarate.

10. The method which comprises heating at a temperature of 200–300° C. a mixture of an alkylated benzene containing from 9 to 27 carbon atoms and having from 1 to 2 hydrogen atoms attached to the α-carbon atom of an alkyl radical thereof, with an alkyl fumarate having from 1 to 8 carbon atoms in the alkyl radical and recovering from the resulting product an adduct in which 1 mole of said alkylated benzene is combined with from 2 to 20 moles of said alkyl fumarate.

11. The method which comprises heating at a temperature of 200–300° C. a mixture comprising isododecylbenzene and an alkyl fumarate having from 1 to 8 carbon atoms in the alkyl radical and recovering from the resulting reaction product an adduct in which 1 mole of said isododecylbenzene is combined with from 2 to 20 moles of said alkyl fumarate.

12. The method which comprises heating at a temperature of 200–300° C. a mixture comprising a diisopropylbiphenyl and an alkyl fumarate having from 1 to 8 carbon atoms in the alkyl radical and recovering from the resulting reaction product an adduct in which 1 mole of the diisopropylbiphenyl is combined with from 2 to 20 moles of the fumarate.

13. The method which comprises heating at a temperature of 200–300° C. a mixture of isododecyltoluene with an alkoxyalkyl fumarate having from 2 to 8 carbon atoms in the alkoxyalkyl radical and recovering from the resulting product an adduct in which 1 mole of the isododecyltoluene is combined with from 2 to 20 moles of the fumarate.

14. The method which comprises heating at a temperature of 240–290° C. a mixture of isododecylbenzene and butyl fumarate and recovering from the resulting reaction product an adduct in which 1 mole of the isododecylbenzene is combined with an average of about 10 moles of butyl fumarate.

15. The method which comprises heating at a temperature of 240–290° C. a mixture of a diisopropylbiphenyl and butyl fumarate and recovering from the resulting reaction product an adduct in which 1 mole of the diisopropylbiphenyl is combined with an average of about 16 moles of butyl fumarate.

References Cited in the file of this patent

UNITED STATES PATENTS

| | | |
|---|---|---|
| 2,301,867 | Gresham | Nov. 10, 1942 |
| 2,511,578 | Geiger | June 13, 1950 |
| 2,570,038 | Smith | Oct. 2, 1951 |
| 2,630,418 | Dazzi | Mar. 3, 1953 |
| 2,665,304 | Patrick | Jan. 5, 1954 |
| 2,752,387 | Rehberg | June 26, 1956 |